United States Patent
McKegney et al.

(10) Patent No.: US 8,627,339 B2
(45) Date of Patent: Jan. 7, 2014

(54) SERVICE-ORIENTED ARCHITECTURE COMPONENT PROCESSING MODEL

(75) Inventors: Ross McKegney, Toronto (CA); Jacob Vandergoot, Bradford (CA)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 12/018,987

(22) Filed: Jan. 24, 2008

(65) Prior Publication Data

US 2009/0193432 A1    Jul. 30, 2009

(51) Int. Cl.
*G06F 13/00* (2006.01)
(52) U.S. Cl.
USPC .......................................... 719/315; 719/313
(58) Field of Classification Search
None
See application file for complete search history.

(56) References Cited

U.S. PATENT DOCUMENTS

| | | | |
|---|---|---|---|
| 7,873,679 B2* | 1/2011 | Knipp | 707/810 |
| 2003/0041178 A1* | 2/2003 | Brouk et al. | 709/313 |
| 2004/0034540 A1* | 2/2004 | Chen et al. | 705/1 |
| 2006/0085243 A1* | 4/2006 | Cooper et al. | 705/8 |
| 2006/0168132 A1* | 7/2006 | Bunter et al. | 709/219 |
| 2007/0288891 A1* | 12/2007 | Aakolk et al. | 717/114 |

* cited by examiner

*Primary Examiner* — Umut Onat
(74) *Attorney, Agent, or Firm* — Novak Druce Connolly Bove + Quigg LLP

(57) ABSTRACT

A service-oriented architecture can include a service provider comprising a plurality of service objects, each service object comprising a self-describing, self-contained, platform independent, modular unit of application logic. The service oriented architecture further includes a service object among the plurality of service objects that is a service implementation having a pre-ordained message processing system. The service implementation can respond to client requests at different levels of granularity and can use a common transfer object message format that separates a business object into its constituent parts. The common set of operations can include at least the Read, Create, Update, Delete, and Execute functions.

12 Claims, 5 Drawing Sheets

SERVICE-ORIENTED ARCHITECTURE COMPONENT PROCESSING MODEL

BACKGROUND

1. Field of the Invention

The present invention relates to the fields of computing and networking and, more particularly, to a service-oriented architecture for enterprises that support multiple interface channels.

2. Description of the Related Art

Within any competitive market, businesses strive to distinguish their products and services from those of their competitors. One way to accomplish this is by positioning themselves within different markets of commerce favored by consumers. These markets can include store-front markets and mail-based markets, such as direct marketing by mail and catalogue based marketing. Markets can also include telephony markets and Internet-based markets, with Internet markets showing a strong increase in market share within recent years.

Customers increasingly expect to be able to interact with a business enterprise seamlessly across multiple markets using different interface channels. For example, a customer purchasing a book from a bookstore chain via a Web site (Internet interface channel) expects to be able to return the book at a local store (store-front interface channel). Similarly, a purchaser of an item from a department catalog (postal mail interface channel) expects to be to contact a service representative through a toll free phone number (telephone interface channel) to determine shipment status. In yet another example, bank customers expect to be able to monitor account activity and conduct transactions through automatic teller machines (kiosk or self-service channel) as well as through a bank's Web site (Internet interface channel).

Business enterprises have conventionally established different software systems for each the various interface channels and/or for each of the various markets at which products or services are provided. That is, one software system can be designed for employee use at store fronts. A separate software system can be used by customer service representatives and interactive voice response systems that provide telephony based services to customers. Yet another software system can provide Web-based access to customers. Another software system can be used for employee payroll and for business expense accounting. Still another software system can be used for enterprise logistics, item warehousing, and item procurement.

It can be difficult to construct interfaces between each of these varying systems of a business enterprise so that information within the systems is synchronized. A lack of synchronization, however, can result in a shortcoming in a customer's experience, as a customer's information from one channel is not available through another channel. In extreme cases, different store-fronts or outlets of the same interface channel, such as different retail outlets, will not have data synchronized with one another, so that a customer's interactions with one retail outlet are not available to the customer or service agent at a different retail outlet.

One of the key technical challenges in developing a software system based on a service oriented architecture (SOA) architectural style is determining the right level of granularity for services. The foundations of SOA can be found in the distributed object programming models such as Distributed COM (DCOM), CORBA, and Java Remote Method Invocation (RMI), however those prior models were more a scale-up from object-oriented programming than a true component service programming model. The challenge is that these services range in granularity from document processing (for example, receiving as input a ledger, request for quote (RFQ), or other large complex document) to simple remote method invocation as previously seen in distributed object processing.

When considering all of the above factors, it is not surprising that enterprises spend enormous sums attempting to maintain, integrate, and update their software systems to provide the appropriate level of granularity in a number of different services. Many of these enterprises find that their expensive and tightly coupled software systems become outdated too quickly or is too inflexible to permit a new desired innovation to be implemented, without an infrastructure redesign, which is often cost prohibitive. Thus, even the best conventionally implemented enterprise software systems that initially provide a competitive advantage can become a competitive liability in years to come.

A new approach for implementing software systems among an enterprise is needed. This approach should utilize a new component service processing model as further described below.

SUMMARY OF THE INVENTION

A service-oriented architecture provides a service oriented architecture with sufficient flexibility in granularity to support scale-up from a simplest action affecting a sub-part of a business object to actions affecting entire business objects or even lists of business objects.

In one embodiment, a service-oriented architecture software system or processing model can include a service provider comprising a plurality of service objects where each service object can include a self-describing, self-contained, platform independent, modular unit of application logic and where a service object among the plurality of service objects can be a service implementation having a pre-ordained message processing system. The service implementation can respond to client requests at different levels of granularity and can use a common transfer object message format that separates a business object into its header and body. The business object can be decomposable into its constituent parts where the business objects are supported by a common set of operations. As noted above, the system or model can support scale-up from a simplest action affecting a sub-part of a business object to actions affecting entire business objects or even lists of business objects. The common set of operations can include Read, Create, Update, Delete, Execute or Broadcast.

When a client invokes a Read operation, the service implementation takes a structured action list and uses the structured action list to resolve a list of business objects to be retrieved where the action list will also indicate a level of detail requested and where the system also handles access control, based on same structured actions and business object types. When a client invokes an Update operation, the service implementation takes a structured action list and uses the structured action list to resolve a list of business objects to be modified and where the action list describes the precise part of the business objects to be affected using XPath or a similar notation that allows for reference to a precise part of the business object. When a client invokes an Execute operation, the service implementation takes a structured action list and uses the structured action list to resolve a list of business objects to be processed wherein the execute operation contains information describing not only which business objects to be updated, but precisely what actions to execute against the business objects. When a client invokes a Broadcast operation, the service implementation takes a structured action list and resolves a list of business objects to be modified using the structured action list, the action list describing the precise part of the business objects to be affected using XPath or a similar notation that allows for reference to a precise part of the business object.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
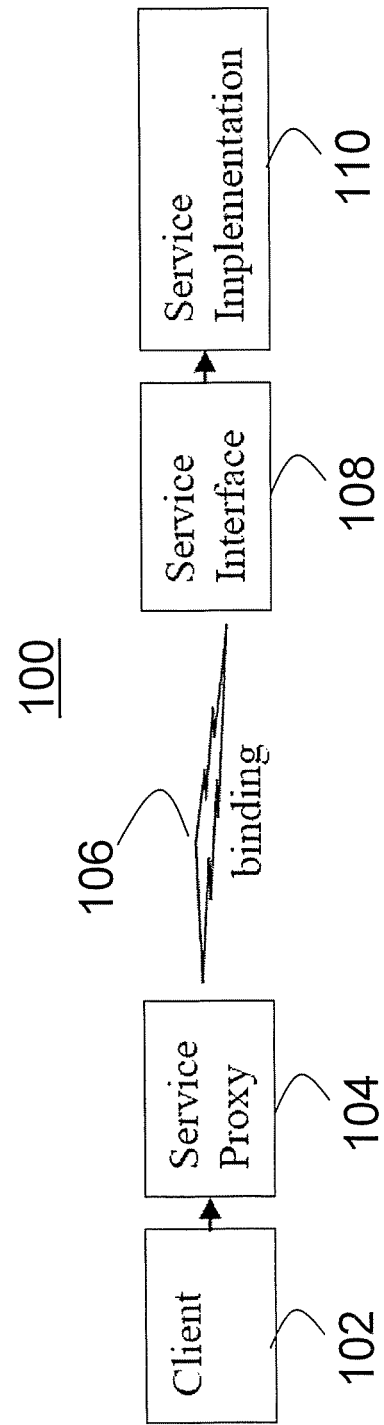
FIG. 1 is a block diagram of a service-oriented software system or architecture including a service implementation in accordance with an embodiment of the present invention.

A system and method for solving a multi-channel problem as described above can be achieved using a service-oriented architecture that provides a consistent, re-usable method for consistently integrating any type of customer or employee interaction with any business process across the enterprise or on-demand utility, while also providing flexible granularity.

In order to provide consistent access to business processes across channels, a common set of business logic can be used to provide a singular method of access to data and function. Employing a service-oriented architecture can provide a framework that links channel applications with enterprise data and functions through a single, common integration layer. The architecture can provide a consistent, re-usable method for consistently integrating any type of customer or employee interaction with any business process across the enterprise or on demand utility.

A service-oriented architecture is based on the composition of a set of services that "provide" application functions. Utilizing an object-oriented approach to enterprise integration leverages the latest techniques for application development to maximize business function delivery and minimize effort. Among the benefits provided by a service-oriented architecture approach combined with a web services based implementation are simplification, abstraction, and loose coupling.

With respect to simplification, interactions can be described in simple XML-based messages with no complex infrastructure. Web services can be self-describing, self-contained modular applications. Such a system and technique can use open standards for description, discovery and invocation of service requests (for example, WSL, SOAP, and HTTP).

With respect to abstraction, a service architecture can expose application functionality as "generic" business functions. Web services can be web-based, local or distributed and services can hide implementation of core systems. Such embodiments can separate adapter development from integration work.

With respect to the benefit of loose-coupling, such service integration can lower the amount of coordination between service suppliers and consumers and can maintain platform and implantation neutrality. Such a system can programmatically discover services and invoke such services over a network. A service is defined with a standard, published interface that includes the information exchanged by a service interaction. These peer services are organized into domains along business functions. Service consumers bind to the service providers through the published interfaces to invoke the appropriate service. In the case where a service provider endpoint is unknown, a consumer may perform a search for the provider in a well-known directory. Since the service consumers and providers operate in this loosely coupled fashion, the method of binding can be dynamic or done at runtime. An underlying data model to define parameters is crucial since the service consumer and provider rely on a common, platform-independent method of information exchange.

Service providers can be the instantiation of a service-oriented architecture. They can be used to enable access to enterprise systems and functions using standardized SOAP XML messages over a common network protocol. Using this approach minimizes the amount of work and infrastructure required to integrate local clients and application servers with centralized resources.

The proposed embodiments herein can address such challenges through a new component service processing model. The processing model elaborates a common structure for business objects, with a decomposable methodology for handling common operations against such business objects. This processing model can allow for the same service to support both the simple "chatty" interactions required by some clients, and the document-level processing required by others. A high-level depiction of the interactions in an SOA context are illustrated in the system 100 of FIG. 1 which includes a client 102 coupled to a service proxy 104, a binding 106, and a service interface 108 coupled to a service implementation 110.

The system 100 is a generic depiction which can be implemented in any number of ways but has the common characteristics of 'services' exposing an interface that clients can invoke. The binding between the client and service is often configurable (for example, to support web services over HTTP, web services over JMS, local binding, etc). As a result, the client program is only responsible for interacting with a proxy to the service, and the details of the binding to the implementation are determined later. This general programming model is well known and defined, with numerous available implementations. What remains undefined is how precisely the service implementation (110) will process the incoming messages. There are known open standards for message processing, including the OAGIS standard, however, even these standards lack the concept of a pre-ordained message processing mechanism.

In existing processing mechanisms, the service implementation uses its discretion in determining how to process an incoming service requests. The embodiments herein improve on the state of the art by providing a general-purpose processing model that can assure a component service implementation that it will be able to effectively respond to client requests at different levels of granularity. This methodology greatly simplifies the client programming model, by providing a common consistent approach to service interactions.

The embodiments herein start with a common transfer object message format that can decompose or separate the business object into its constituent parts such as its header and body. The business object format should be structured, such that it is decomposable into its constituent parts. A common set of operations that are supported against these business objects can also be used. These can include, for example, Read, Create, Update, Delete, etc.

The common message format and action list are pre-requisites to the development of a processing model for SOA services, but are generally not sufficient. In the case of an exemplar implementation, the OAGIS open standard message format can be used. The present embodiments leverage a standard message structure and supported operations, in conjunction with the SOA architectural style denoted above, and build upon it with a processing model that addresses the key challenges in the design and construction of service implementations.

Illustrations of the processing model in the context of supported operations can provide further insight into the benefits provided by the processing model. Such supported operations can include functions or operations such as the Read, Update, Execute, and Broadcast operations.

When the client invokes a Read operation, the service implementation takes the structured action list and uses it to resolve a list of business objects to be retrieved. The action list will also indicate a level of detail requested (for example, to retrieve a summary or detailed representation of the matching business objects). The processing model will use a common processing algorithm to retrieve the required information from its data repository and return it to the client. The processing model can also handle access control, based on the same structured actions and business object types.

When the client invokes an Update operation, the service implementation takes the structured action list and uses it to resolve the list of business objects to be modified, and also precisely notes which parts of those business objects will be affected. The action list describes the precise part of the business objects to be affected using XPath or similar notation that allows for reference to a precise part of the business object. In this manner, an Update action could prescribe that the service should update an entire business object, or simply change a subpart of the business object. As with Read, access control can be applied to the specific actions and business object types.

When the client invokes an Execute operation, the service implementation takes the structured action list and uses it to resolve the list of business objects to be processed. The execute action will contain information describing not only which business objects to be updated, but precisely what actions to execute against these objects.

The Broadcast processing is virtually identical to Update processing, the only difference being the semantics of the calling sequence. As with Update, the Broadcast message includes an action list that indicates precisely which parts of the referenced business objects to modify. In essence, this is a methodology that supports scale-up from the simplest action affecting a sub-part of a business object, to actions affecting entire business objects or even lists of business objects. Given a common processing model simplifies the development of reusable/recomposable services, and also the development of clients of the services.

Figure 2:
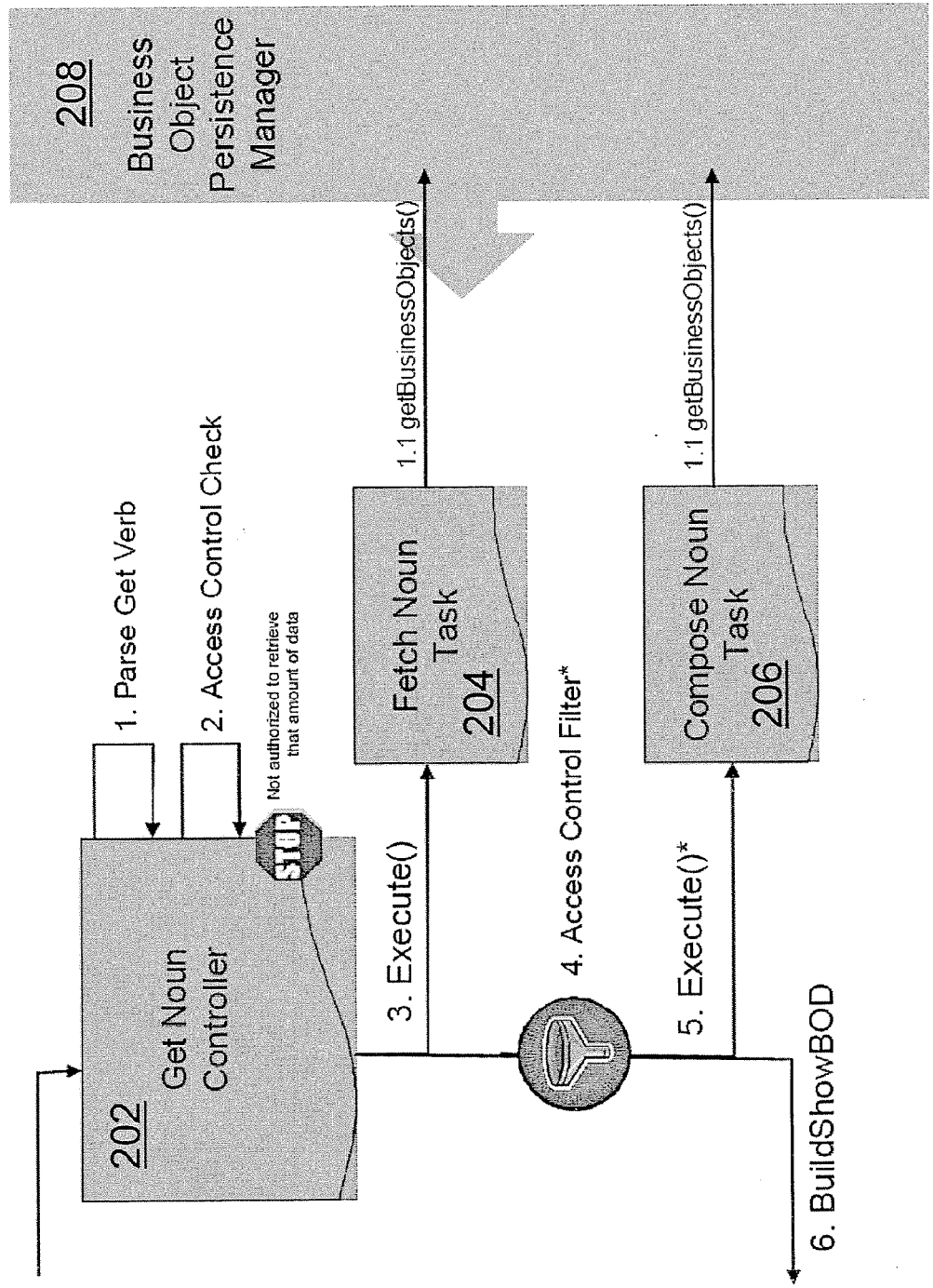
FIG. 2 is another block diagram of a service-oriented software system illustrating a Get processing pattern in accordance with an embodiment of the present invention.

Referring to the system 200 of FIG. 2, the following describes an implementation of the processing model based on the OAGIS message standard and using code assets following the Controller and Command patterns to handle the decomposition of task execution. The Service Oriented Architecture Get Processing pattern involves a controller command 202 or "Get Controller" that delegates to task commands 204 and 206. In particular the task commands involve (1) a Fetch command 204 that pulls the data for the requested business objects from the persistence layer having a business object persistence manager 208 and transforms it into the OAGIS logical structure; and (2) an optional Compose command 206 that is used to augment the Business Objects (BOs) retrieved by the fetch, for example, to add computed values or aggregate with content from an alternate data source.

In particular, the GetNoun command is the controller command 202 that will extract the search information from the request, delegate to a fetch command to return the list of nouns that match the expression and show verb response and package the response in the ShowNoun response. The GetNoun command can use the XPath selector approach to choose the appropriate fetch command implementation to retrieve the data. Although a default implementation can be used in most cases, an extension allows for additional business logic to be added for particular search expressions. Optionally, for those access profiles that can include additional information based on business logic or from an external system, the controller command 202 can instantiate an instance of a compose command for a particular access profile to populate more data. The compose command is optional and should be used in those cases where the information cannot be retrieved from the persistence layer 208.

The default fetch implementation will use the Business Object Manager (BOM) passing the search expression extracted from the Get verb. This search expression includes the XPath, access profile and paging information. The BOM in turn will use the logical mediators and data service to retrieve the data and convert it to its logical representation. The result of the BOM will be the paging information and logical nouns matching the expression. This information will be passed back by the fetch command which the GetNoun command will wTap in the ShowNoun response.

Below is a detailed flow description of the Get processing pattern as illustrated in FIG. 2.
1. The Business Object Document (BOD) processor sets the GetBOD on the GetNounCmd.
2. The BOD processor invokes the GetNounCmd.
3. The GetNounCmd parses the Get verb (using SearchExpression)
4. The GetNounCmd will use the command factory to instantiate a FetchNounCmd. (The FetchNounCmd implementation will be instantiated based on interface name and XPath key).
5. The GetNounCmd will set the Get verb and parsed Get verb on the FetchNotmCmd.
6. The GetNounCmd invokes the FetchNounCmd.
7. The FetchNounCmd will obtain an handle of the BOPM and execute the findObjects passing in the parsed Get verb.
8. The BOM will execute the expression and return the logical Nouns and paging information.
9. The FetchNounCmd will create the Show response.

10. The GetNounCmd will ask for the list of Nouns and Show from the FetchNounCmd.
11. The GetNounCmd will use the command factory to instantiate a ComposeNounCmd. (The ComposeNounCmd implementation will be instantiated based on the interface name and the access profile of the request).
12. Only if a ComposeNounCmd is found; otherwise this step is skipped.
   (1) The GetNounCmd will set the Get verb, parsed Get verb and List of nouns from the FetchNounCmd.
   (2) The GetNounCmd invokes the ComposeNounCmd.
   (3) The ComposeNounCmd will process the list of Nouns and add more data to the existing list. More data can either be calculated by some business function or retrieved from the BOPM or another external service.
13. The GetNounCmd creates the ShowBOD response and sets the Show verb from the FetchNounCmd and the List of Nouns (which may be updated by the ComposeNounCmd).

With a Service Oriented Integration (SOI) implementation, the Change requests will be mapped to an existing Commerce controller commands and the requested Business Object Document is converted into the name value pair parameters that is passed to the controller command. This is for reuse of the existing business logic and enabling them as a service. But there are limitation using this model since it is difficult to represent structure objects into name value pairs. Another limitation is that the change request can only have one action.

As part of the SOA programming model the limitation of one action in the change request is lifted to make valuable services that is not limited by the implementation. As a result of removing this restriction and having the ability to deal with structured objects, a pattern should be defined on how to process these requests. The purpose for this pattern is that all implementations behave the same so that it is easy for customers to understand the implementation of a change service and more importantly understand the extension points.

Figure 3:
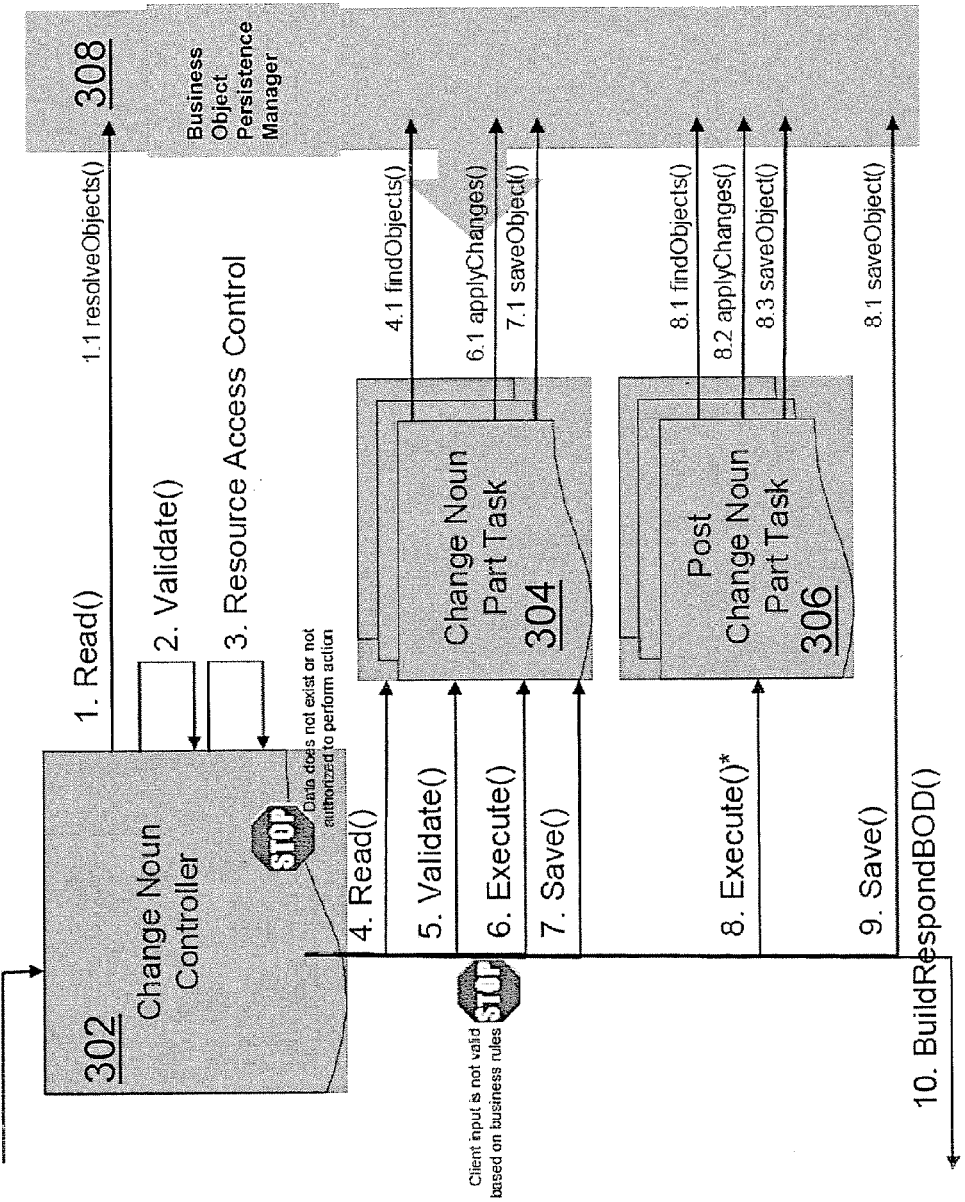
FIG. 3 is a block diagram of a service-oriented software system illustrating a Change processing pattern in accordance with an embodiment of the present invention.

For a change request processing pattern, the logic can be broken into three types of commands as shown in part in the system 300 of FIG. 3. The first command is the Change controller command 302 that helps to break the request into smaller tasks and execute these tasks. These smaller task commands will act upon parts of a noun instead of the entire noun. The controller command 302 also attempts to fetch the required data for the request upfront and passes this data to other task commands 304 so the command will use and update common data elements. This is to avoid data collision between task commands where they may act upon the same data and to avoid the performance overhead of each task commit changes and the next task must read from the database to pick up those changes. Once all the tasks are executed, the data read upfront will be persisted so the changes will be committed in the database.

The second type of command is the business logic (Create, Update and Delete) CUD task commands that perform the appropriate action on the noun. This task deals with a particular part of the noun and is passed to the action to perform on the part of the noun that has changed and on the original request noun along with the data that was retrieved by the controller. The controller can have many instances of these task commands to act upon the many parts that are being changed as part of the message. The controller is responsible for executing the different task commands to perform the entire change operation. These business logic CUD tasks just need to work with nouns and understand how to deal with a particular part being modified.

The final type of command is any post business logic 306 that may result because of a change of that part of the noun. These business logic tasks may not be necessary but there are cases where post evaluation on the changed business object will be needed as a result of changing specific parts. The change controller 302 will create instances of these business tasks and execute them after performing the change actions. These tasks will be given the actions performed on the part, the original request noun and the currently read and updated data that has not been persisted yet. These business logic tasks are optional so if no implementation is found, then the change controller will assume no additional business logic is required. As in the previous example, the system 300 further includes a Business Object Persistence Manager 308.

Below is a detail flow description of the Change processing pattern as illustrated in FIG. 3.
1. The BOD processor sets the ChangeBOD on the ChangeNounCmd.
2. The BOD processor invokes the ChangeNounCmd.
3. The ChangeNounCmd parses the ChangeBOD, extracting the nouns and the actions associated with the noun.
4. The ChangeNounCmd performs a read operation to resolve the specified Nouns. The read will return a Map containing each noun and the corresponding persistence container for the noun.
5. The ChangeNounCmd performs a simple validation to ensure the nouns have been resolved and any other global validation logic. These validation errors are captured. current context can perform the specified actions on the specified nouns. These access control errors are captured.
6. The ChangeNounCmd performs access control to ensure the current user under the current context can perform the specified actions on the specified nouns. These access control errors are captured.
7. If validation or access control errors were reported, an application exception is raised containing all the errors and processing is stopped. If no errors occur, processing continues.
8. The ChangeNounCmd instantiates the change part action and change part post action task commands and set the initial resolved objects and the nouns that will be involved for that task with a list of actions for each noun.
9. For each change part action task command, the read and validate are invoked to retrieve additional data and validate the actions. All validation errors that occur are captured.
10. If any validation error results, an application exception is raised containing all the validation errors and processing is stopped. If no validation errors occur, the processing continues.
11. Each change part action task command is invoked. If an exception occurs, processing halts and the exception is thrown.
   (1) The change part will iterate through the nouns and perform the specified actions for that noun part.
   (2) After all the nouns part actions have been performed, the save is called to persist changes on the data which was read by the task command.
12. Each change part post action task command is invoked. If an exception occurs, processing halts and the exception is thrown.
13. The ChangeNounCmd calls save( ) to persist any changes made to the original objects retrieve during the initial read.
14. The ChangeNounCmd calls buildResponseBusinessObjectDocument( ) to create the appropriate response for the request and that response is returned.

The SOI implementation of a process request is similar to that of a SOI implementation of a change request. This means that the existing message mapping feature will be used to transform the Process OAGIS request to a particular controller command passing resolved name value pairs resolved from the message. Because of this implementation, it limits the ability of the service where the one action per request rule was still maintained.

Figure 4:
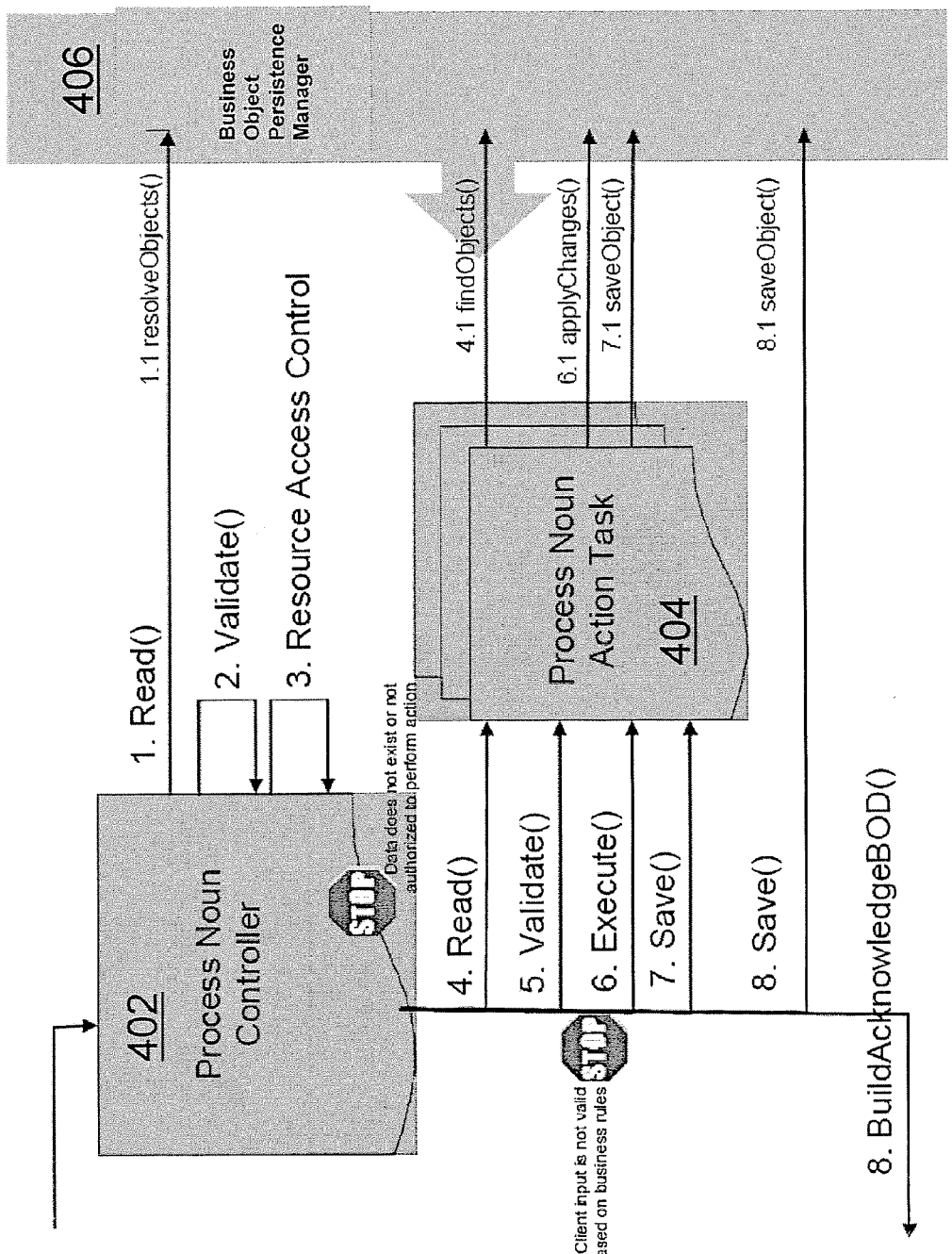
FIG. 4 is a block diagram of a service-oriented software system illustrating a process request processing pattern in accordance with an embodiment of the present invention.

Based on a new programming model or SOA Process Processing Pattern 400 as illustrated in FIG. 4, the restriction of one action per request is lifted but the rule is that the process action must act upon the entire noun. Unlike the change implementation where the change affects parts of the noun, the process applies to the noun specified in the request. Based on the information within a noun will control the actions of the business logic. Similar to the design pattern of Change process pattern, the Process pattern consists of a Process controller 402 which will read common data across the actions within the request and instantiate a task command implementations 404 for those actions and execute them. This pattern is a much simplified version than the pattern required for processing the Change request shown in FIG. 3. Again, as in the previous examples, the system 400 further includes a Business Object Persistence Manager 406.

Below is a detail flow description of the SOA Process processing pattern as illustrated in FIG. 4.

1. The BOD processor sets the ProcessBOD on the ProcessNounCmd.
2. The BOD processor invokes the ProcessNounCmd.
3. The ProcessNounCmd parses the ProcessBOD, extracting the nouns and the actions associated with the noun.
4. The ProcessNounCmd performs a read operation to resolve the specified Nouns. The read will return a Map containing each noun and the corresponding persistence container for the noun.
5. The ProcessNounCmd performs a simple validation to ensure the nouns have been resolved and any other global validation logic. These validation errors are captured.
6. The ProcessNounCmd performs access control to ensure the current user under the current context can perform the specified actions on the specified nouns. These access control errors are captured.
7. If validation or access control errors were reported, an application exception is raised containing all the errors and processing is stopped. If no errors occur, processing continues.
8. The ProcessNounCmd instantiates the process action task commands and set the initial resolved objects, the noun and action expression that will be involved for that action task.
9. For each process action task command, the read and validate are invoked to retrieve additional data and validate the actions. All validation errors that occur are captured.
10. If any validation error results, an application exception is raised containing all the validation errors and processing is stopped. If no validation errors occur, the processing continues.
11. Each process action task command is invoked. If an exception occurs, processing halts and the exception is thrown.
12. The ProcessNounCmd calls save( ) to persist any changes made to the original objects retrieve during the initial read.
13. The ProcessNounCmd calls buildAcknowledgeBusinessObjectDocument( ) to create the appropriate response for the request and that response is returned.

Synchronization or sync requests send out notifications when data has changed for a system that contains the master data record. The sync request will contain the updated version of the business object and sends out notification to all other listening systems to update their version of the business object.

Although the purpose of sync requests is for a system to synchronize the information pertaining to the business object, the processing pattern for a sync request is similar to the change processing pattern illustrated previously in FIG. 3. When processing the sync request, the system will be updating its copy of the business object with the data from the sync request. The sync request will contain actions of what triggered the message to be sent and these actions correspond with the actions of a change request. In some cases, additional business logic will be required but this business logic may be different then the actual change logic.

Figure 5:
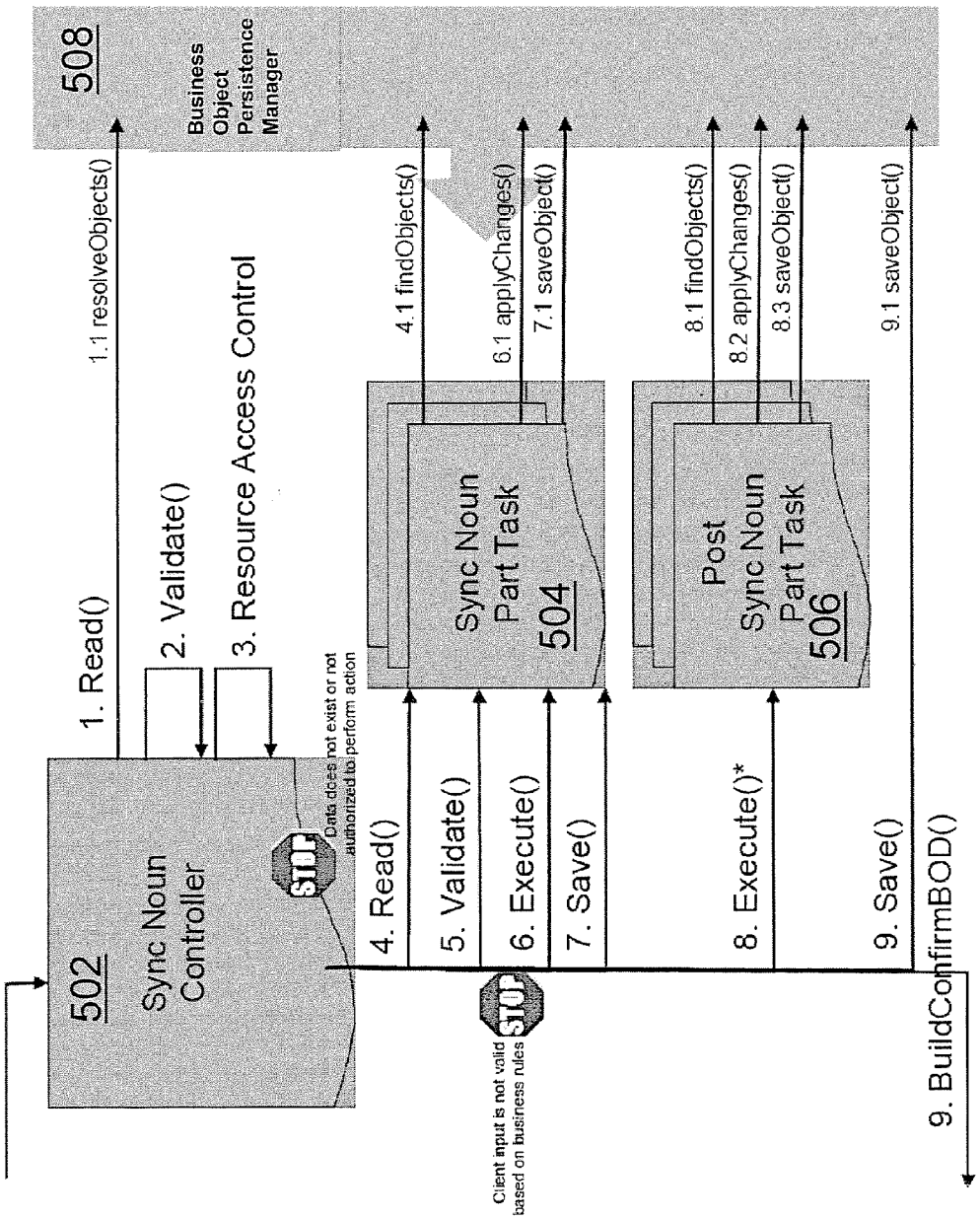
FIG. 5 is a block diagram of a service-oriented software system illustrating a Sync processing pattern in accordance with an embodiment of the present invention.

The classes involved with a sync request will be similar as Change processing pattern, except that the Sync implementation will be explicitly created to account for the slight differences of processing a Sync request. There will be reuse of objects so common commands can be reused for both service requests with some slight differences in the interfaces. A Sync process pattern or model 500 is just an extension of the change processing pattern and in one embodiment as shown in FIG. 5 can include a Sync Noun controller 502, a Sync Noun Part Task 504, a Post Sync Noun Part Task 506 as well as a Business Object Persistence Manager 508. Refer to Change processing pattern above for detail flow and access control.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A service-oriented component processing system for solving multi-channel problems, the service-oriented component processing system comprising:
   a processor;
   a memory;
   a first module for causing the processor to provide a service provider comprising a plurality of service objects, each service object comprising a self-describing, self-contained, platform independent, modular unit of application logic; and
   a second module for causing the processor to provide a service object among the plurality of service objects to operate as a service implementation having a pre-ordained message processing system using a common transfer object message format that separates business objects into a header and a body, wherein the service implementation is configured to respond to a client invocation of a Read operation by taking a structured action list and using the structured action list to resolve a list of business objects to be retrieved and responding to the Read operation with data for each of the business objects in the list of business objects to be retrieved via a persistence layer of the service implementation, the data for each of the business objects is in one of a detailed form or a summary form based on a configuration of the invocation of the Read operation indicated in the structured action list, and wherein the processing system for the Read operation comprises a Get controller command that invokes:

an appropriate Fetch task command selected by using an XPath to obtain data via the persistence layer corresponding to the data specified in the client invocation of the Read operation to yield obtained data and to transform the obtained data into an OAGIS logical structure, where the Fetch task command uses the persistence layer passing a search expression, the search expression comprising the XPath, an access profile, and paging information, and an optional Compose task command for selectively augmenting the obtained data with content from an alternate source when a portion of the data specified in the client invocation of the Read operation is unavailable via the persistence layer, where the Compose task command is based on an interface name and the access profile, wherein the service implementation is configured to respond to a client invocation of an Update operation by taking the structured action list and using the structured action list to resolve a list of business objects to be modified and where the action list describes precise parts of the business objects to be modified using a notation that allows for reference to a precise part of a business object, and wherein the processing system for the Update operation comprises a Change controller command that fetches data to be updated, performs validation and access control on the data to be updated, and invokes:

a Change task command for updating the data to be updated, and an optional Post Change task command for evaluating changes to the business objects.

2. The system of claim 1, wherein the service implementation responds to client requests at different levels of granularity.

3. The system of claim 1, wherein each of the business objects is arranged and constructed to be decomposable into its constituent parts.

4. The system of claim 3, wherein the business objects are supported by a common set of operations.

5. The system of claim 1, wherein the system supports scale-up from an action affecting a sub-part of one of the business objects to actions affecting entire business objects or lists of business objects.

6. The system of claim 1, wherein when the client invokes an Execute operation, the service implementation takes a structured action list and uses the structured action list to resolve a list of business objects to be processed, wherein the execute operation contains information describing which business objects to be updated and what actions to execute against the business objects, and wherein the processing system for the Execute operation comprises a Process controller command that fetches the data and invokes an Action task command for performing the action on the data.

7. The system of claim 1, wherein when the client invokes a Broadcast operation, the service implementation takes a structured action list and uses the structured action list to resolve a list of business objects to be modified and where the action list describes the precise part of the business objects to be affected using a notation that allows for reference to a precise part of the business object, and wherein the processing system for the Broadcast operation comprises a Sync controller command that fetches the data and invokes at least one Sync task command for updating of the data and Post Sync task command for evaluating syncing of the business objects.

8. A computer readable storage having stored thereon a computer program for implementing, via a computer, a service-oriented architecture component processing model for processing messages to a service implementation for solving multi-channel problems, the computer program comprising a plurality of code sections for:

implementing a service provider comprising a plurality of service objects, each service object comprising a self-describing, self-contained, platform independent, modular unit of application logic;

implementing a service object among the plurality of service objects being a service implementation having a pre-ordained message processing system using a common transfer object message format that separates business objects into a header and a body; and configuring the service implementation to respond to client requests at different levels of granularity, wherein the service implementation is configured to respond to a client invocation of a Read operation by taking a structured action list and using the structured action list to resolve a list of business objects to be retrieved and responding to the Read operation with data for each of the business objects in the list of business objects to be retrieved via a persistence layer of the service implementation, the data for each of the business objects is in one of a detailed form or a summary form based on a configuration of the invocation of the Read operation indicated in the structured action list, and wherein the processing system for the Read operation comprises a Get controller command that invokes:

an appropriate Fetch task command selected by using an XPath to obtain data via the persistence layer corresponding to the data specified in the client invocation of the Read operation to yield obtained data and to transform the obtained data into an OAGIS logical structure, where the Fetch task command uses the persistence layer passing a search expression, the search expression comprising the XPath, an access profile, and paging information, and an optional Compose task command for selectively augmenting the obtained data with content from an alternate source when a portion of the data specified in the client invocation of the Read operation is unavailable via the persistence layer, where the Compose task command is based on an interface name and the access profile, wherein the service implementation is configured to respond to a client invocation of an Update operation by taking the structured action list and using the structured action list to resolve a list of business objects to be modified and where the action list describes precise parts of the business objects to be modified using a notation that allows for reference to a precise part of a business object, and wherein the processing system for the Update operation comprises a Change controller command that fetches data to be updated, performs validation and access control on the data to be updated, and invokes:
- a Change task command for updating the data to be updated, and
- an optional Post Change task command for evaluating changes to the business objects.

9. The computer-readable storage of claim 8, wherein each of the business objects is arranged and constructed to be decomposable into its constituent parts.

10. The computer-readable storage of claim 8, wherein the model is configured to support scale-up from an action affecting a sub-part of at least one of the business objects to actions affecting entire business objects or lists of business objects.

11. The computer-readable storage of claim 8, further comprising code sections for, responsive to the client invoking an Execute operation, configuring the service implementation to take a structured action list and use the structured action list to resolve a list of business objects to be processed, wherein the Execute operation contains information describing which business objects to be updated and what actions to execute against the business objects, and wherein the processing system for the Execute operation comprises a Process controller command that fetches the data and invokes an Action task command for performing the action on the data.

12. The computer-readable storage of claim 8, further comprising code sections for, responsive to the client invoking a Broadcast operation, the service implementation takes a structured action list and uses the structured action list to resolve a list of business objects to be modified and where the action list describes the precise part of the business objects to be affected using a notation that allows for reference to a precise part of the business object, and wherein the processing system for the Broadcast operation comprises a Sync controller command that fetches the data and invokes at least one Sync task command for updating of the data and Post Sync task command for evaluating syncing of the business objects.

* * * * *